(12) United States Patent
Bavard et al.

(10) Patent No.: US 9,043,065 B2
(45) Date of Patent: May 26, 2015

(54) METHOD OF ADJUSTING THE ELECTRICAL SUPPLY VOLTAGE FOR THE OPERATION OF AT LEAST ONE ELECTRICALLY POWERED VEHICLE

(75) Inventors: Xavier Bavard, Bailleulval (FR); Eric Chattot, Meudon (FR); Jean-Noël Verhille, Oignies (FR)

(73) Assignee: Siemens S.A.S., Saint-Denis (FR)

( * ) Notice: Subject to any disclaimer, the term of this patent is extended or adjusted under 35 U.S.C. 154(b) by 152 days.

(21) Appl. No.: 13/997,354

(22) PCT Filed: Sep. 15, 2011

(86) PCT No.: PCT/EP2011/066026
§ 371 (c)(1),
(2), (4) Date: Jul. 29, 2013

(87) PCT Pub. No.: WO2012/084281
PCT Pub. Date: Jun. 28, 2012

(65) Prior Publication Data
US 2013/0304299 A1  Nov. 14, 2013

(30) Foreign Application Priority Data
Dec. 23, 2010 (EP) .................................... 10290676

(51) Int. Cl.
*B60L 9/00* (2006.01)
*H02J 7/34* (2006.01)
(Continued)

(52) U.S. Cl.
CPC ... *H02J 7/34* (2013.01); *B60L 9/00* (2013.01); *B60L 11/1801* (2013.01);
(Continued)

(58) Field of Classification Search
CPC . B60L 2200/26; B60L 11/16; B60L 11/1803; B60L 11/1837; B60L 11/185; B60L 9/18; B60L 11/1801; B60M 3/06; B60M 7/003; B60M 1/30; Y02T 10/7005; Y02T 10/646; Y02T 10/7027; Y02T 10/7088

USPC ............ 701/22, 101, 112; 307/18, 43, 60, 64; 903/905, 930
See application file for complete search history.

(56) References Cited

U.S. PATENT DOCUMENTS 7,869,913 B2 * 1/2011 Aoyama et al. .................. 701/22
2002/0096412 A1 * 7/2002 Batisse ........................ 191/22 R
(Continued)

FOREIGN PATENT DOCUMENTS

DE 102008030342 A1 12/2009
FR 2819759 A1 7/2002
(Continued)

OTHER PUBLICATIONS

Reiner, K., "Einsatzmöglichkeiten für Energiespeicher im elektrischen Bahnbetrieb", Elektrische Bahnen eb91, Oct. 1993, pp. 331-335, R. Oldenbourg Verlag, Muenchen, Germany.

*Primary Examiner* — Redhwan K Mawari
(74) *Attorney, Agent, or Firm* — Laurence A. Greenberg; Werner H. Stemer; Ralph E. Locher

(57) ABSTRACT

A vehicle is supplied by a first electrical energy storage unit on board the vehicle, and a ground electrical network providing an energy supply by application of a supply voltage through electrical distribution. The first energy storage unit is controllable under a generator regime or a receiver regime. The supply voltage is adjusted, in the generator regime, by applying an algebraically additive supply voltage originating from the first electrical storage unit to the distribution, to maintain a supply voltage above a minimum threshold. In the receiver regime, if a surplus of supply voltage originating at least partially from a second storage unit in the generator regime is detected above the minimum threshold, this surplus is channeled energetically to the first energy storage unit of the vehicle if it is required for operating the vehicle and enables maintaining the supply voltage below a maximum threshold and above the minimum threshold.

19 Claims, 3 Drawing Sheets

(51) Int. Cl.
B60L 11/18 (2006.01)
B60W 10/26 (2006.01)

(52) U.S. Cl.
CPC ........ B60L 11/1842 (2013.01); B60L 11/1844 (2013.01); B60W 10/26 (2013.01); *Y02T 10/7088* (2013.01); *Y02T 10/7005* (2013.01); *Y02T 90/163* (2013.01); *Y02T 90/14* (2013.01); *Y02T 90/128* (2013.01); *Y04S 10/126* (2013.01); *Y02E 60/721* (2013.01); *B60L 2200/26* (2013.01); *Y10S 903/93* (2013.01); *Y10S 903/905* (2013.01)

(56) References Cited

U.S. PATENT DOCUMENTS

| | | | | |
|---|---|---|---|---|
| 2007/0278059 A1* | 12/2007 | Afriat | .......... | 191/29 R |
| 2008/0097661 A1* | 4/2008 | Moran | ............ | 701/22 |
| 2008/0147260 A1* | 6/2008 | Moran | ............ | 701/22 |
| 2010/0057323 A1* | 3/2010 | Jourdes | ........... | 701/101 |
| 2010/0145562 A1* | 6/2010 | Moran | ............ | 701/22 |
| 2011/0095604 A1* | 4/2011 | Bavard et al. | ........... | 307/12 |
| 2012/0119579 A1* | 5/2012 | Jin et al. | ........... | 307/60 |
| 2012/0274144 A1* | 11/2012 | Gasparini et al. | ........ | 307/80 |
| 2013/0038127 A1* | 2/2013 | King et al. | ....... | 307/64 |
| 2013/0096759 A1* | 4/2013 | Breton et al. | ........ | 701/22 |
| 2013/0304299 A1* | 11/2013 | Bevard et al. | ........ | 701/22 |
| 2014/0035366 A1* | 2/2014 | Ganor | ............ | 307/18 |
| 2014/0167515 A1* | 6/2014 | Feuerstack et al. | ............ | 307/81 |
| 2014/0256330 A1* | 9/2014 | Liu et al. | ............ | 455/446 |
| 2014/0263238 A1* | 9/2014 | Ulrich et al. | ............ | 219/130.21 |
| 2014/0368041 A1* | 12/2014 | Tu et al. | ............ | 307/52 |

FOREIGN PATENT DOCUMENTS

| | | |
|---|---|---|
| FR | 2866607 A1 | 8/2005 |
| WO | 2009153416 A1 | 12/2009 |

* cited by examiner

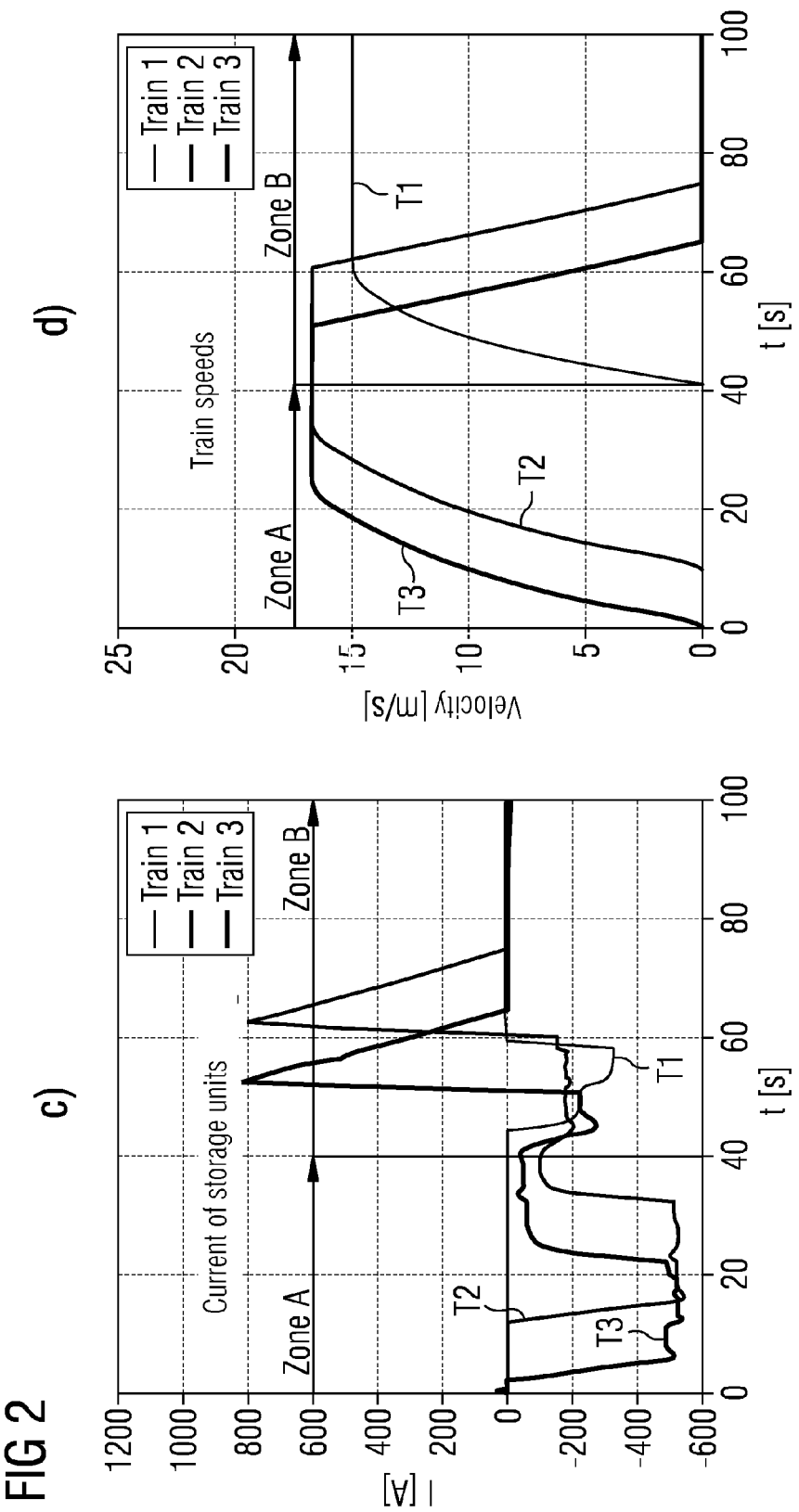

METHOD OF ADJUSTING THE ELECTRICAL SUPPLY VOLTAGE FOR THE OPERATION OF AT LEAST ONE ELECTRICALLY POWERED VEHICLE

BACKGROUND OF THE INVENTION

Field of the Invention

The present invention mainly relates to a method of adjusting the electrical supply voltage for operation of at least one electrically powered vehicle that is supplied by at least: a first electrical energy storage unit on board the vehicle, or a ground electrical network providing the vehicle at least with a supply of energy by application of a supply voltage via a means of electrical distribution.

Traction energy supply network systems for a metro line (or other public transport vehicles such as trams, trolleybuses, buses, trains, driverless transport units, etc.) are subject to fluctuations in energy dependant on the number of vehicles on line but also on their synchronism. These variations in energy flow have a predominant action on the quality of energy distribution provided by supply rails or other similar means. These variations and thus said quality are thus dependant on the characteristics per unit length of the distribution rails but are also a function of the distance separating the sources of supply of fixed equipment on the vehicle. This results in great variations in supply voltage to the vehicles and their on-board equipment which, picked up by the mechanical collector shoes of the vehicle on a supply rail, give rise to disturbances which might affect the propulsion devices.

Under-supply to propulsion devices is an aggravating phenomenon since it leads very generally to over-currents.

For vehicles equipped with modern rotating field drives, the quality of the pulsation converter input voltage is far higher than for older vehicles which mainly used direct current machines. When the voltage no longer corresponds to a lower limit, mechanisms are then put in place to prevent erratic propulsion behavior. As an example, field weakening of an electrical machine/component is a possible on-board solution which is a response to this problem, but its implementation increases the losses of said machine and is in fact the cause of declining energy efficiency.

Sizing of the energy distribution installations for a metro line made up of driven train sets or vehicles, calculated for a maximum capacity of the number of vehicles on line, allows for the operation of the line in all operating modes (rush hours and off-peak times). The sizing of the installations takes account of power peaks so as to guarantee the availability and reliability of the system. In order to rectify a decline in the quality of energy distribution by the supply rails, "feeders" (electrical supplies) are installed at points (along the line) to limit excessive drops in voltage and losses on line. The need to install feeders is subordinate to a lower limit of supply voltage delivered by the rails which should not be exceeded and beyond which the operation of equipment on board the vehicles is no longer guaranteed. By defining an energy supply zone working in a broad range and not requiring corrective actions (installation of feeders), a compromise is then made between the energy performance of the system and the installation costs, which constitutes a delicate dilemma to be resolved.

BRIEF SUMMARY OF THE INVENTION

An object of the present invention is to propose a method of adjusting the electrical supply voltage for operation of at least one vehicle supplied by at least:
a first electrical energy storage unit on board the vehicle,
a ground electrical network providing the vehicle at least with a supply of energy by application of a supply voltage via a means of electrical distribution, said method making it possible at least to minimize variations in energy flow in a public transport supply network.

A solution is presented by the method of adjusting the electrical supply voltage as claimed.

A set of sub-claims also presents advantages of the invention.

Exemplary embodiments and applications are provided by means of figures:

DESCRIPTION OF THE INVENTION

Figure 1:
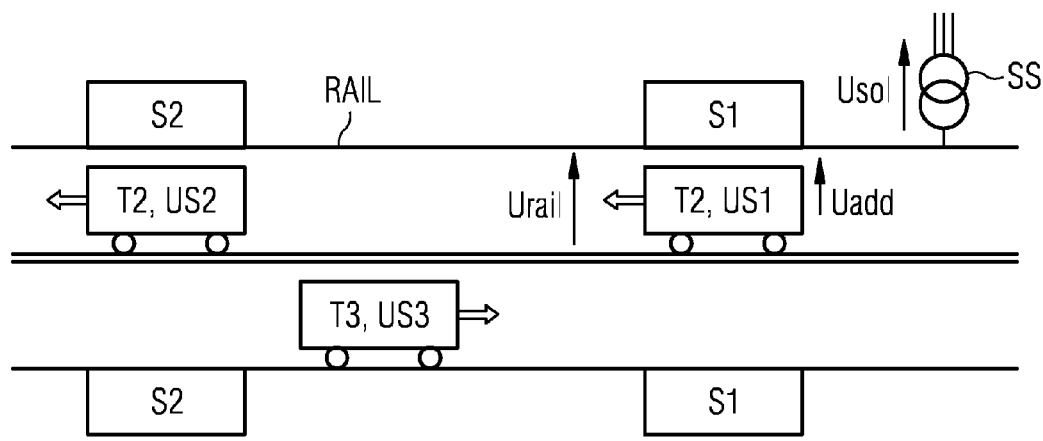
FIG. 1 Exemplary application of the method according to the invention in accordance with a public transport pattern, FIG. 2 Representation of parameters associated with the method according to the invention: (a) rail voltage picked up by vehicles, (b) currents absorbed by sources, (c) storage unit currents, (d) vehicle speeds.

FIG. 1 presents an example of a simulated application of the method according to the invention for a section of bidirectional tracks supplied by a sub-station SS under a voltage Usol (=750V) and comprising three trains T1, T2, T3 (T1 and T2 being on the track running to the left and T3 being on the second track running to the right). A distance separating a first station S1 from the sub-station SS is 1000 m and a distance between the first and a second station S2 is 1200 m (in right to left order: SS, S1, S2). The characteristics per unit length of the voltage distribution rails from the ground to the trains are taken into account and are 22 m$\Omega$/m. In the simulation presented below, the first train T1 departs at t=40 s, the second train T2 starts after 10 s and the third train T3 departs immediately at 0 s.

In principle, the method according to the invention is based on a method of adjusting the electrical supply voltage for operation of at least one vehicle, here for example the first train T1, (of the public transport unit type) supplied by at least:
a first electrical energy storage unit US1 on board said vehicle,
a ground electrical network SS providing the vehicle at least with a supply of energy by application of a supply voltage Usol (=750V) via a means of electrical distribution (RAIL),
characterized in that
the first energy storage unit US1 is controllable under two regimes termed generator and receiver, in that:
in the generator regime, an algebraically additive supply voltage Uadd originating from the first electrical storage unit US1 is applied to the distribution means RAIL so as to maintain an effective supply voltage Urail above a predefined minimum threshold Urail_min;
in the receiver regime, if a surplus of supply voltage Urail originating at least partially from a second storage unit US2 (for example here as a unit on board the second train T2) in the generator regime is detected above the minimum threshold Urail_min, this surplus is channeled energetically to the first energy storage unit US1 of the first vehicle if it is required for the operation of said first vehicle and makes it possible to maintain the supply voltage Urail below a predefined maximum threshold Urail_max and above the predefined minimum threshold Urail_min.

The method according to the invention provides that the second energy storage unit, here for example US2 or another storage unit on the ground or on board, is selected according to a spatial and temporal traffic pattern for several vehicles, here T1, T2, T3, and a ground electrical network infrastructure, here SS, RAIL but also, if provided, energy storage unit placed for example on the ground in at least one of the stations S1, S2. In this way, depending on the local availabilities allowing for generator or emitter regimes of one or other storage unit, the supply voltage can be effectively adjusted in line with the needs of one of the vehicles.

For this purpose, the second energy storage unit can advantageously be on board at least a second vehicle, here the second train T2 and/or the third train T3. Linear combinations of generator (and analogously emitter) regimes of different on-board and/or ground storage units can thus be adopted in order to adjust a supply voltage required for one of the vehicles.

Also, the second storage unit US2 can switch into potentially generator mode, in particular when the second vehicle is parked in a garage/maintenance/delivery zone and it still has usable energy available to adjust the effective supply voltage for "active" trains in the public transport network. This is particularly appropriate during off-peak times when a greater number of trains are parked in the garage.

Alternatively or complementarily, the second energy storage unit can be placed and selected as part of the method according to the invention in the ground electrical network, such as at a vehicle station S1, S2, a vehicle garage zone (charging point), a supplier's energy distribution zone or an intermediate energy supply zone on a vehicle route.

The means of electrical distribution RAIL extends either continuously along a vehicle route between two stations, ideally by a rail or a catenary, or discontinuously between two stops, ideally by a rail or a catenary of finite length around a station. If it is discontinuous, ground storage units can act as a "battery" contributing to providing for exchanges of energy between the trains so that they can autonomously ensure self-adjustment of the effective supply voltage depending on their position in the public transport network. More generally, in the case of discontinuous electrical distribution, a generator regime of the second storage unit is advanced temporally with respect to the receiver regime of the first storage unit, anticipating provisional energy storage in a third storage unit linked to the means of distribution (RAIL) and sequentially activated in receiver then generator regime, complementarily to the successive regimes of the first and the second storage unit.

It is also provided that the first energy storage unit (just like any other on-board storage unit) is rechargeable by energy recovery originating from at least one of the following sources:
from the vehicle, ideally during braking
from the ground electrical network
from other units of the type of the second energy storage unit which, if on-board, also recover the braking energy of their associated vehicles, these other units thus playing the role of means of transfer (generator regime) of the intrinsic energy from one unit to another unit in receiver regime, or instantaneously on a line.

In order to provide generator and receiver regimes which can be activated flexibly and rapidly, the energy storage units store and deliver energy by means of a high-power capacitive element such as at least one super-capacitor potentially associable with a battery if necessary or any other means hybridizing the super-capacitor.

In order to be able to implement the method according to the invention, the energy storage unit, whatever it may be (on-board or not), is controlled by a management algorithm for sizing the energy requirement, taking account of a traffic pattern for a plurality of vehicles, a tolerable effective supply voltage interval for each of the vehicles and, if available, a group of complementary ground energy storage units or vehicles in parking/maintenance. Thus, using this information, it is possible to define groupings of units/trains under generator regimes (for example under braking) while other units/trains require a receiver regime for example for starting.

The sizing algorithm advantageously follows a logic of minimization of the peak power originating from the ground electrical network, compensating for said peaks by energy supplies distributed by at least one energy storage unit in generator regime. Advantageously again, the management algorithm follows a logic of minimization of the maximum value of the effective current delivered at a station, at least to maintain said value equal to or below a target threshold for energy consumption assigned by a ground electrical network distributor. Exceeding "normal" consumption can thus be avoided to the advantage of the public transport network manager while protecting the environment against great over-consumption of energy.

The algorithm can be centralized and executed from a ground control post in communication with vehicle and station control and command units, but it can also be distributed over vehicles communicating together and thus able autonomously (or in a group) to manage their switching to generator and receiver modes in accordance with secure logic configurations.

Practically, a computer for implementing the method is proposed and includes:
a module for determining and managing the supply voltage in an interval imposed by the ground electrical network and a minimum and maximum on-line voltage threshold
a module for controlling the variations imposed on energy storage and delivery of energy from at least one of the energy storage units.

This computer is an ideal medium for executing the algorithm described above. It can therefore be centralized or distributed in the vehicles, stations and/or on the ground by means of an appropriate communications network.

Advantageously, the determination and management module and the control module are on-board, in order to be able rapidly and as autonomously as possible to provide and request a requirement under receiver regime or alternatively notify an availability for switching to generator regime in accordance with the method according to the invention. Depending on the infrastructures of the public transport network, the computer can then be connected to a communication interface between ground and vehicle or any other communications network making it possible at least to transmit information on energy requirement or availability from one train to another, if necessary via or with energy storage units in a station.

Returning to FIG. 1 and FIG. 2, which is directly associated with it, the moments of departure of the three trains T1, T2, T3 have been selected here so as to meet a configuration which might be encountered in the operation of a real system. The results or parameters associated with the method according to the invention are presented in FIG. 2. Two time zones A and B can be used to analyze the operation of this configuration. Zone A relates to the start-up of the second and third trains T2, T3, respectively at t=10 s and t=0 s, and zone B starts at t=40 s for the start-up of the first train T1. In zone A, it is found that the voltage delivered by the rails for these two trains falls (curves on FIG. 2(*a*)) representing the rail supply voltage picked up by the trains), which then actuates the operation of their storage units US2, US3 under generator regime (curves on FIG. 2(*c*)=storage unit current). The participation of said storage units US2, US3 in the supply of propulsion energy is complementary to that delivered by the sub-station SS, which delivers a current of the order of 400 A (dotted curve on FIG. 2 (*b*)=currents absorbed by the "fixed and potential" energy sources).

Figure 2:
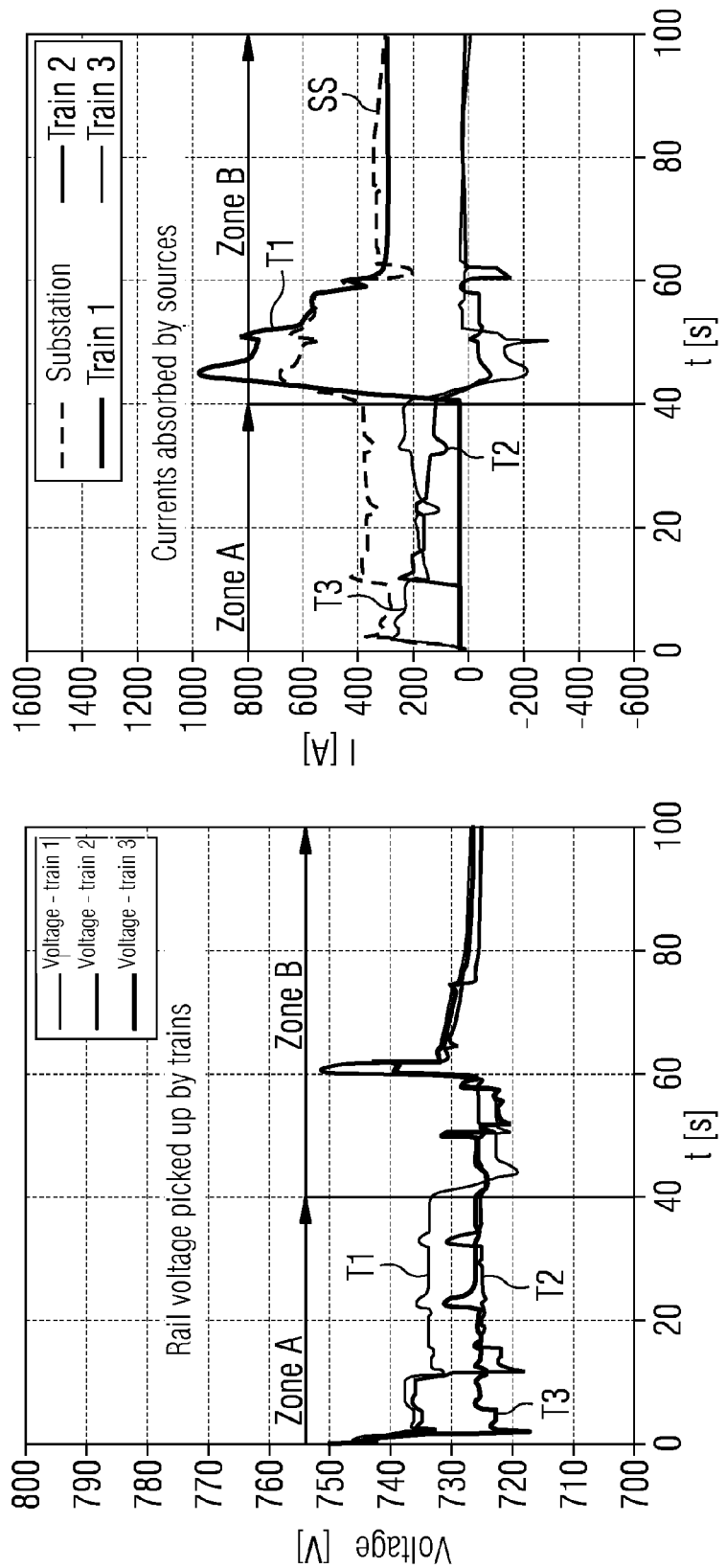

Operating zone B then concerns the start-up of the first train T1, but also the slow-down phases of the second and third trains T2, T3. At the start-up of the first train T1 at t=40 s, we observe on FIG. 2(*a*) a drop in the supply voltage of the rail Urail associated with the first train T1. The first train T1 is thus in a typical desired receiver regime situation. FIG. 2(*b*) illustrates the participation of the other two mobile sources, which then operate under generator mode and contribute to the adjustment of the voltage of the distribution rails (curves T2, T3). The currents of the mobile sources T2, T3 are then used under generator mode to contribute to the propulsion of the first train T1. It is verifiable that, according to FIG. 2(*b*), the current absorbed by the first train T1 is the algebraic sum of the currents provided by the sub-station SS and the other two trains T2, T3.

In other words, in generator regime, an algebraically additive supply voltage Uadd originating from the second and third electrical storage units US2, US3 is applied to the distribution means RAIL in order to maintain a supply voltage Urail above a predefined minimum threshold (Urail_min, not represented) so as to respond to the receiver regime of the first train T1. A supplementary contribution of supply voltage or current (see Usol, FIG. 1 in sub-station SS supplying the rail) is therefore advantageously avoided.

From a point of view of the first train T1 in receiver regime, since a surplus of supply voltage Urail originating from the second and the third storage units US2, US3 in generator regime is detected above the minimum threshold (Urail_min, not represented), this surplus is channeled energetically to the first energy storage unit US1 of said first train T1, in the knowledge that it is required for the operation of said train and makes it possible to maintain the supply voltage Urail below a predefined maximum threshold (Urail_max, not represented) (to compensate for peak power) and above the predefined minimum threshold (Urail_min) (useful for driving the first train).

The invention claimed is:

1. A method of adjusting an electrical supply voltage for operation of a vehicle supplied by at least:
   a first electrical energy storage unit on board the vehicle,
   a ground electrical network providing the vehicle at least with a supply of energy by application of a supply voltage via an electrical distribution device; and
   the method which comprises:
   selectively controlling the first energy storage unit under a generator regime and a receiver regime;
   in the generator regime, applying an algebraically additive supply voltage originating from the first electrical storage unit to the distribution device so as to maintain a supply voltage above a predefined minimum threshold;
   in the receiver regime, if a surplus of supply voltage originating at least partially from a second storage unit in the generator regime is detected above the minimum threshold, channeling the surplus energetically to the first energy storage unit of the vehicle if it is required for an operation of the vehicle and makes it possible to maintain the supply voltage below a predefined maximum threshold and above the predefined minimum threshold.

2. The method according to claim 1, which comprises selecting the second energy storage unit according to a spatial and temporal traffic pattern for several vehicles and a ground electrical network infrastructure.

3. The method according to claim 1, wherein the second energy storage unit is installed in at least a second vehicle.

4. The method according to claim 3, which comprises switching the second storage unit into potentially generator mode.

5. The method according to claim 4, which comprises switching the second storage unit into generator mode when the second vehicle is parked in a garage/maintenance/delivery zone.

6. The method according to claim 1, wherein the second energy storage unit is placed in a ground electrical network.

7. The method according to claim 6, wherein the second energy storage unit is disposed at a vehicle station, a vehicle garage zone, a supplier's energy distribution zone or an intermediate energy supply zone on a vehicle route.

8. The method according to claim 1, wherein the electrical distribution device extends either continuously along a vehicle route between two stations, or discontinuously between two stations.

9. The method according to claim 8, wherein the electrical distribution device extends by a rail or a catenary continuously along the vehicle route between two stations, or discontinuously between two stations by a rail or a catenary of finite length around a station.

10. The method according to claim 8, which comprises, in the case of discontinuous electrical distribution, temporally advancing a generator regime of the second storage unit with respect to the receiver regime of the first storage unit, anticipating provisional energy storage in a third storage unit linked to the distribution device and sequentially activating in receiver regime then generator regime, complementarily to the successive regimes of the first and the second storage unit.

11. The method according to claim 1, wherein the first energy storage unit is rechargeable by energy recovery originating from at least one of the following sources:
   from the vehicle;
   from the ground electrical network
   from other units of a type of the second energy storage unit which, if on-board, also recover the braking energy of the respectively associated vehicles.

12. The method according to claim 1, which comprises recharging the first energy storage unit by way of energy recovery during braking of the vehicle.

13. The method according to claim 1, wherein the energy storage units store and deliver energy by way of a high-power capacitive element embodied as at least one super-capacitor potentially associable with a battery.

14. The method according to claim 1, which comprises controlling the energy storage unit by an algorithm for sizing and management of an energy requirement, taking account of a traffic pattern for a plurality of vehicles, a tolerable supply voltage interval for each of the vehicles and, if available, a group of complementary ground energy storage units.

15. The method according to claim 14, wherein the sizing algorithm follows a logic of minimization of a peak power originating from the ground electrical network, compensating for peaks by energy supplies distributed by at least one energy storage unit in generator regime.

16. The method according to claim 14, wherein the sizing and management algorithm follows a logic of minimization of the maximum value of the effective current delivered at a station, at least to maintain the value equal to or below a target threshold for energy consumption assigned by a ground electrical network distributor.

17. An apparatus for adjusting an electrical supply voltage for operation of a vehicle supplied by at least:
a first electrical energy storage unit on board the vehicle,
a ground electrical network providing the vehicle at least with a supply of energy by application of a supply voltage via an electrical distribution device,
the apparatus comprising:
a module for determining and managing the supply voltage in an interval imposed by the ground electrical network and a minimum and maximum on-line voltage threshold; and
a module for controlling the variations imposed on energy storage and delivery levels of at least one of the energy storage units; and
the computer being configured for:
selectively controlling the first energy storage unit under a generator regime and a receiver regime;
in the generator regime, applying an algebraically additive supply voltage originating from the first electrical storage unit to the distribution device so as to maintain a supply voltage above a predefined minimum threshold;
in the receiver regime, if a surplus of supply voltage originating at least partially from a second storage unit in the generator regime is detected above the minimum threshold, channeling the surplus energetically to the first energy storage unit of the vehicle if it is required for an operation of the vehicle and makes it possible to maintain the supply voltage below a predefined maximum threshold and above the predefined minimum threshold.

18. The apparatus according to claim 17, wherein said module for determining and managing and said module for controlling are disposed on-board.

19. The apparatus according to claim 17, which comprises a communication interface for communication between ground and vehicle.

* * * * *